R. R. HUGHES, Jr.
SWEAT BAND SEWING MACHINE.
APPLICATION FILED DEC. 14, 1915.
1,257,239.
Patented Feb. 19, 1918.
6 SHEETS—SHEET 3.
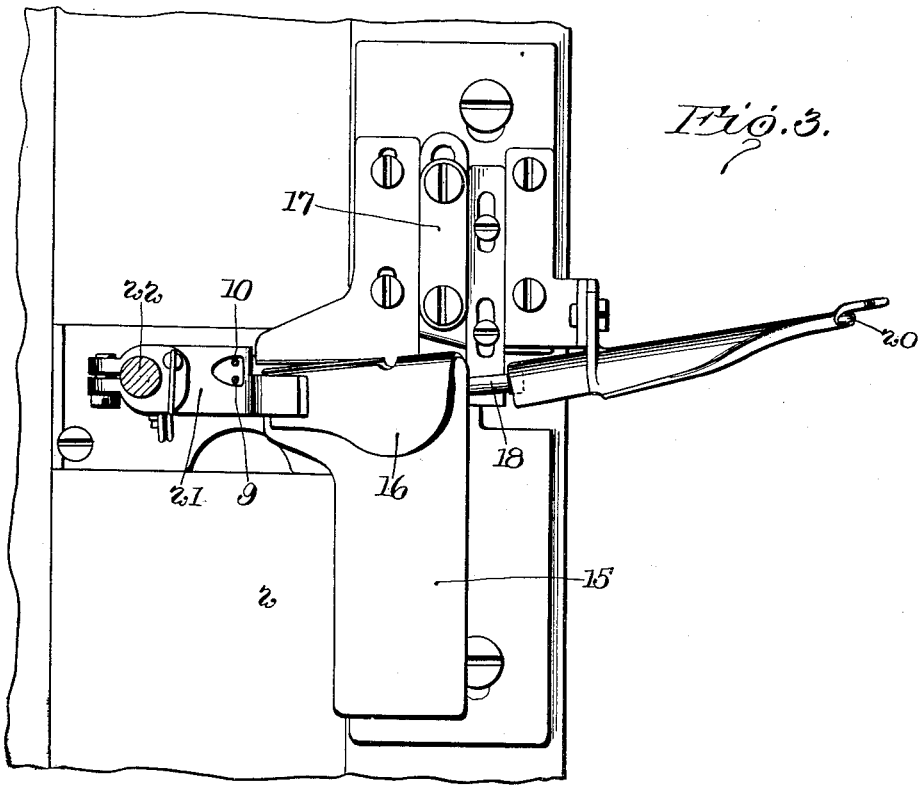
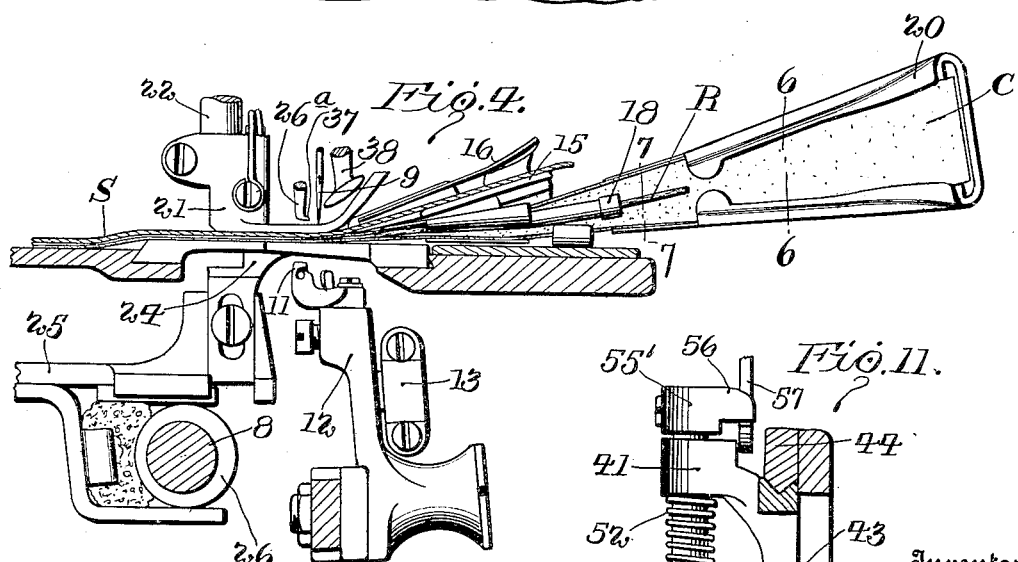
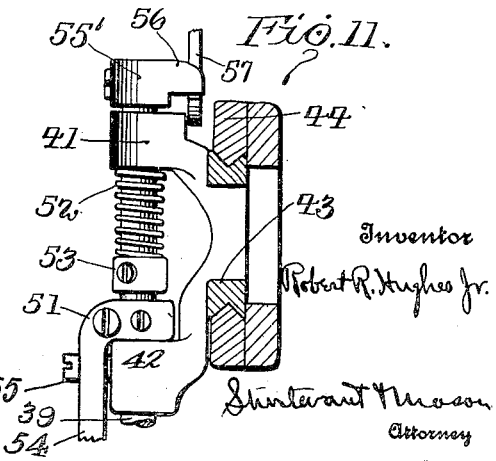
Inventor
Robert R. Hughes Jr.
Witnesses
By Sturtevant Mason
Attorney

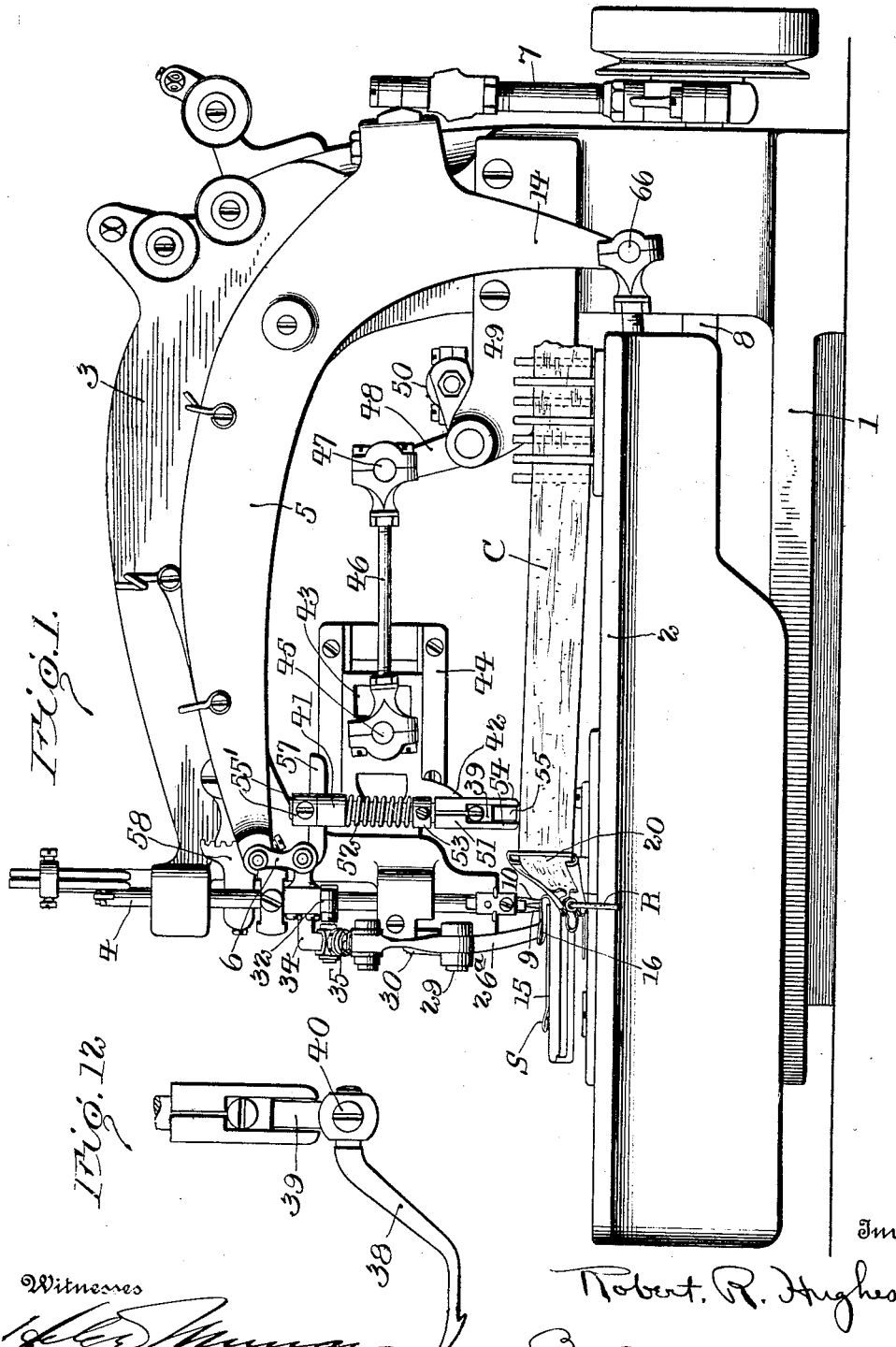

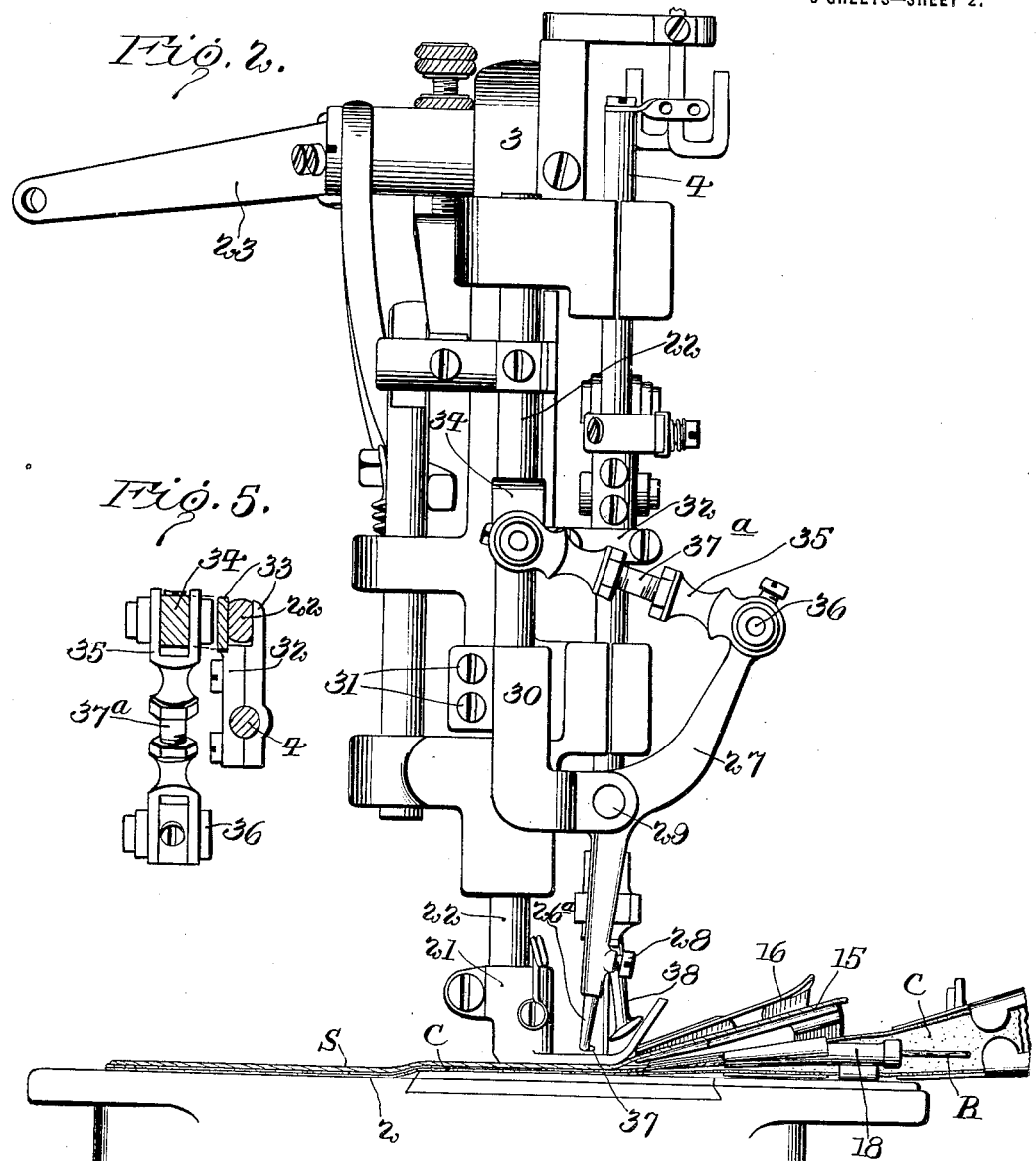

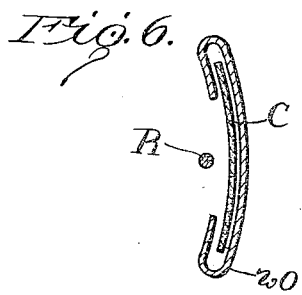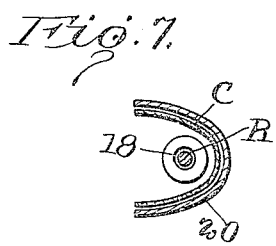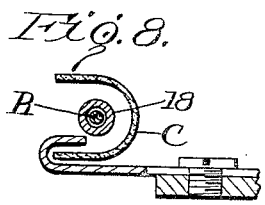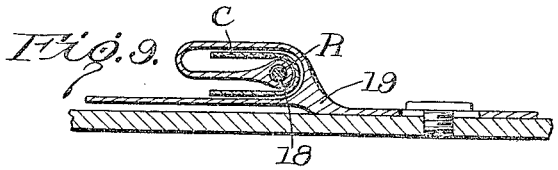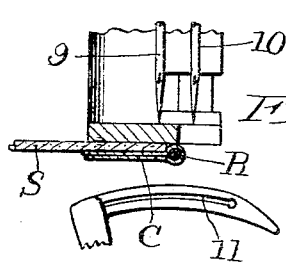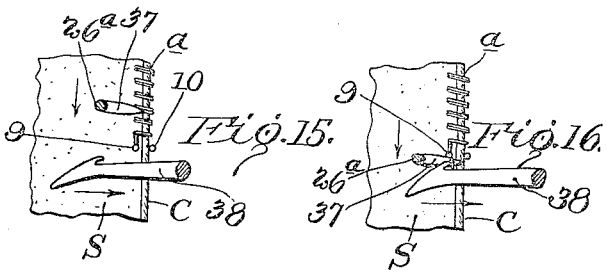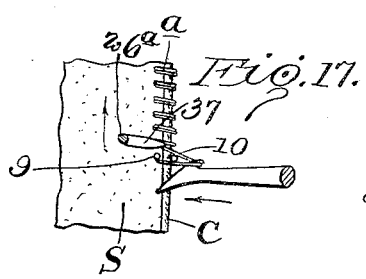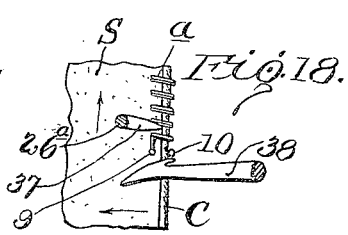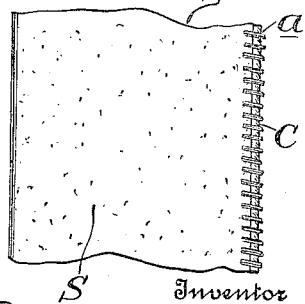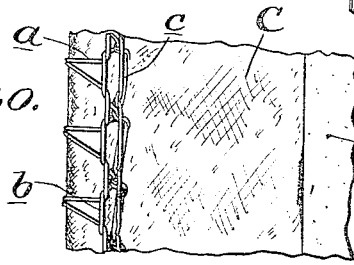

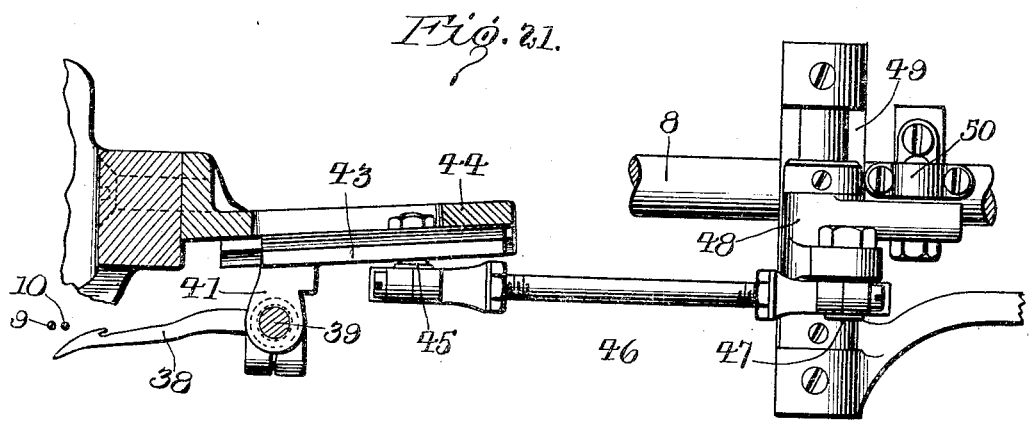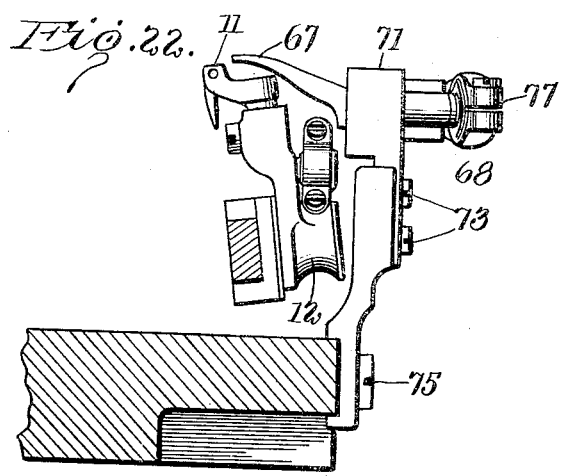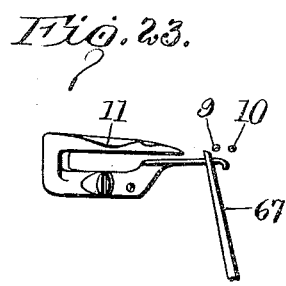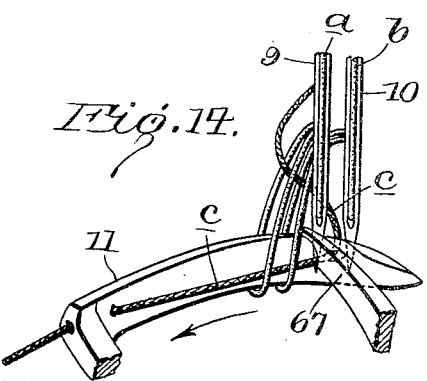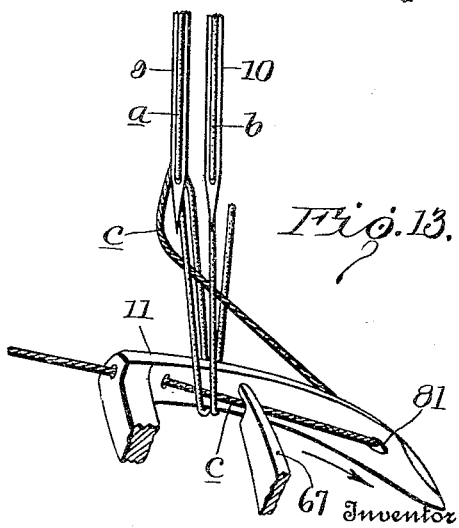

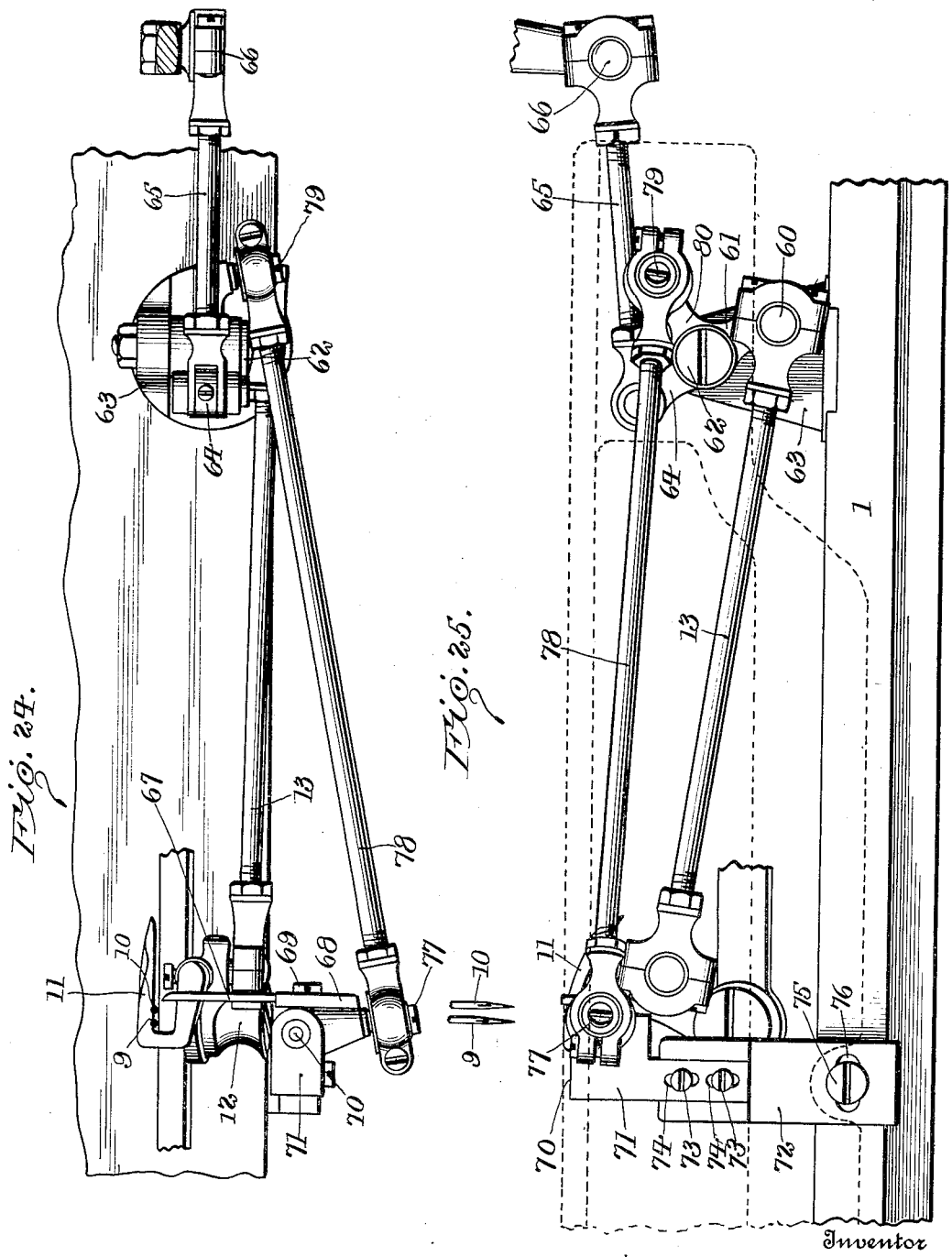

UNITED STATES PATENT OFFICE.

ROBERT R. HUGHES, JR., OF UTICA, NEW YORK, ASSIGNOR TO UNION SPECIAL MACHINE COMPANY, OF CHICAGO, ILLINOIS, A CORPORATION OF ILLINOIS.

SWEAT-BAND-SEWING MACHINE.

1,257,239.   Specification of Letters Patent.   Patented Feb. 19, 1918.

Application filed December 14, 1915. Serial No. 66,836.

*To all whom it may concern:*

Be it known that I, ROBERT R. HUGHES, Jr., a citizen of the United States, residing at Utica, in the county of Oneida, State of New York, have invented certain new and useful Improvements in Sweat-Band-Sewing Machines, of which the following is a description, reference being had to the accompanying drawing and to the figures of reference marked thereon.

The invention relates to new and useful improvements in sewing machines for stitching the reed and reed cover to the sweat band for a hat.

Prior to the present invention machines have been designed for this purpose, wherein two needles are used, one of which enters the sweat band and the other passes over the edge of the reed cover. Coöperating with the needles above the work support is a thread manipulating implement which distends the needle thread of the needle passing through the sweat band and positions the same in loop form for the other needle to enter. Coöperating with the needles beneath the work support is a single looper which enters both needle loops when moving in a direction toward the outer or free edge of the sweat band. The looper is provided with a retainer or deflector for drawing and holding back both needle loops, so as to position the needle loops and the looper thread, so that only the inner needle—that is, the needle passing through the sweat band, passes into the thread triangle and locks the looper thread. In a machine of this character great strain is placed upon the needle threads owing to the thread retainer on the looper which engages both needle loops and draws them back, so that the needle may pass between these needle loops and the looper thread, as above stated.

An object of the present invention is to provide a machine of the above character, with a loop deflector or retainer which is separate from the looper and which is so positioned as to engage the outer needle loop and move the same back along the looper so that the inner needle may pass between both needle loops on the one hand and the looper thread on the other hand.

A further object of the invention is to provide an improved means for operating the retainer or deflector and looper, so that they may be moved in proper timing to accomplish the result stated.

A still further object of the invention is to provide an improved means for engaging with certainty the inner needle thread above the material and forming a loop therein for the other needle.

These and other objects will in part be obvious and will in part be hereinafter more fully disclosed.

In the drawings, which show by way of illustration, one embodiment of the invention—

Figure 1 is a front view of a sewing machine embodying my improvements;

Fig. 2 is an end view of the same, certain of the parts in rear of the sewing head being omitted;

Fig. 3 is a view, partly in section and partly in plan, showing the work support, the presser foot, the guiding devices for the sweat band, the reed and the reed cover;

Fig. 4 is a vertical sectional view at one side of the presser foot and transversely of the machine, showing the presser foot, a part of the feeding mechanism, a part of the looper mechanism, the work support and the guiding devices for the sweat band, the reed and the reed cover;

Fig. 5 is a detail in plan showing the means for vibrating the thread retainer or deflector;

Fig. 6 is a sectional view on the line 6—6 of Fig. 4;

Fig. 7 is a sectional view on the line 7—7 of Fig. 4;

Fig. 8 is a sectional view of the under edge guide for the reed cover and the reed guide;

Fig. 9 is a transverse sectional view through the folding guide for the reed cover and the guide for the reed;

Fig. 10 is a transverse sectional view, more or less diagrammatic, showing the position of the sweat band, the reed and the reed cover relative to the presser foot and the needles;

Fig. 11 is a sectional view showing the means for raising the thread hook with the presser foot;

Fig. 12 is a detail front elevation showing the thread hook and its supporting shank;

Fig. 13 is a view showing more or less diagrammatically the looper, the needles and the looper thread retainer, the parts being positioned with the looper at the forward end of its stroke and the retainer retracted;

Fig. 14 is a similar view, but showing the needles having descended, the retainer having moved forward and holding back the needle loops and the inner needle entering the triangle formed by the needle loops, the looper thread and the body of the looper;

Fig. 15 is a view, in plan, showing diagrammatically the position of the needles, the thread deflector and the thread hook when the needles are substantially at the lower end of their stroke;

Fig. 16 is a similar view, but showing the position of the deflector when the needle points have been raised above the work and said deflector is deflecting the thread of the needle which penetrates the sweat band into a position to be engaged by the hook;

Fig. 17 is a similar view, but showing the hook having formed a loop in the needle thread and the outer needle entering said loop;

Fig. 18 is a similar view showing the thread hook having released the loop and the deflector returning to its extreme rear position;

Fig. 19 is a top plan view showing a portion of a hat sweat and reed cover stitched on my improved mechanism;

Fig. 20 is a bottom plan view of the same;

Fig. 21 is a view partly in section and partly in plan, showing the thread hook and the means for operating the same and also the inclination of the guiding bracket supporting said thread hook;

Fig. 22 is a view partly in section and partly in end elevation, showing a portion of the bed plate, the bracket supporting the retainer, the looper carrier and the looper;

Fig. 23 is a view in plan, showing more or less diagrammatically the looper and the retainer in extreme left-hand positions;

Fig. 24 is a view partly in section and partly in plan, showing the looper and the retainer and the devices for operating the same;

Fig. 25 is a side view of the same, also showing the needles, and showing in dotted lines the work support.

The machine to which my invention is applied is especially adapted for stitching the reed and reed cover to a sweat band for a hat. Said machine is provided with two needles and a single thread carrying looper coöperates with these needles beneath the work support. Above the work support there is a thread hook and thread deflector which coöperate in forming a loop in the left-hand needle thread, which loop is positioned so that the right-hand needle will enter the same. The sweat band is guided so that the edge thereof will pass between the needles. The machine is also provided with means for folding a reed cover and guiding a reed within said cover and the said reed and cover are also guided so as to project slightly beyond the edge of the sweat band but between the needles. The looper moves in a direction toward the free edge of the sweat band when said looper is moving into the needle thread loops. Coöperating with the looper beneath the work support is a thread retainer which is preferably mounted to swing about a horizontal axis and is so timed as to move forward and engage the outer needle loop on the looper and slightly move the same back along the looper, so that both needles will pass in front of the needle loops. The looper is so timed that the looper thread running from the eye of the looper to the previous stitch will be positioned between the needles when the needle points are passing the looper. Therefore, the needle that is passing through the sweat band will pass into the triangle formed by both needle loops, the looper thread and the body of the looper. The needle thread of the inner needle above the work support is deflected forward from the path of the needle by a thread finger which engages the needle thread while the needle is up and this deflected needle thread is guided by a thread hook and distended laterally or formed into a loop for the entrance of the other or outer needle on its downward stroke. This thread hook moves back and forth in a right line and the guiding bracket therefor is set so that the path of movement of the thread hook is slightly inclined away from a line at right angles to the line of feed. This inclination is toward the rear of the machine and this facilitates the placing of the needle thread loop for the entrance of the needle.

Referring more in detail to the drawings, my improved hat sweat sewing machine consists of a supporting bed 1 carrying a work support 2. An overhanging arm 3 is mounted on the bed, and a needle bar 4 reciprocates in the free end of said overhanging arm. Said needle bar is reciprocated by a needle lever 5. The needle lever is connected by a link 6 to a lug on the needle bar. Said needle lever is oscillated by a link 7 which coöperates with an eccentric on the main shaft 8. This needle bar carries two needles 9 and 10.

Coöperating with the needles beneath the work support is the looper 11. This looper is mounted on a looper carrier 12 and is oscillated by a link 13 connected to the needle lever extension 14 by mechanism hereinafter described. The looper 11 is mounted so as to enter first the needle thread loop of the needle 9 and then the needle thread loop of the needle 10. The hat sweat, indicated at S in the drawings, is led over a guiding plate 15 which has its edge folded back at 16 to form a guide for the hat sweat. This guiding plate is carried by a supporting shaft 17 which is adjustably attached to the work support and is set so that the edge of the hat sweat passes between the needles 9 and 10, see Fig. 3.

A reed, indicated at R in the drawings, is led through a suitable guiding tube 18. This guiding tube is formed as a part of the folder 19 for the reed cover which is indicated at C. The folder 19 is provided with a receiving end 20 into which the reed cover is led in a substantially vertical position, and this guide 19 is so shaped as to fold the reed cover about the reed and guide the same so that the covered reed only projects beyond the hat sweat S, see Fig. 10. The reed also passes between the needles 9 and 10, so that the outer needle 10 passes beyond the outer edge of the hat sweat and reed cover while the needle 9 passes through the hat sweat and reed cover. The means for guiding the hat sweat and the reed and reed cover form no part of the present invention and further description thereof is not thought necessary.

The hat sweat and reed cover are held on the work support 2 by a presser foot 21. This presser foot is carried by a presser bar 22 which is mounted in the free end of the overhanging arm 3. Said presser bar may be raised by a lever 23 which is of the usual construction. The material is fed through the machine by a feed dog 24 carried by a feed bar 25 which is raised and lowered by an eccentric 26 on the main shaft 8, and this feed dog is moved back and forth by the usual operating mechanism.

Coöperating with the needles above the work support is a thread deflector 26ª. This thread deflector is secured to the lower end of the lever 27 by a set-screw 28. The lever 27 is pivoted at 29 to a bracket arm 30 which is clamped to the presser bar 22 by screws 31. Mounted on the needle bar is a block 32. This block is clamped to the needle bar and projects rearwardly therefrom. Said block at its rear end is forked at 33 so as to have a sliding engagement with the presser bar 22. This merely holds the block from turning on the needle bar. The outer member of the fork of the block is extended upwardly and outwardly and then downwardly to form an arm 34. A link 35 is pivoted at one end to said arm 34 and is pivoted at its other end to the upper end of the lever 27, as indicated at 36. The link 35 includes a rod 37ª having right and left hand screw threads at its respective ends, so that the length of the link may be adjusted. As the needle bar vibrates up and down, this lever 27 will, through the link 35, be oscillated in a plane substantially parallel with the line of feed.

The thread deflector is bent laterally at its lower end to form a finger 37. This finger is so positioned that the same will engage the needle thread of the needle 9 between the needle point and the material and distend said thread forwardly from the path of movement of the needle.

Coöperating with the thread deflector is a thread hook 38. This thread hook 38 is clamped to the lower end of a rod 39 by a suitable set-screw 40. The rod 39 is mounted in bearings 41 and 42 carried by a plate 43 which is mounted to slide in a bracket 44 attached to the overhanging arm. Said plate 43 carries a ball stud 45 which is engaged by a link 46. The other end of this link is connected to a ball stud 47 mounted on a rock lever 48. The rock lever is journaled in a bracket 49 attached to the head of the machine and is oscillated by an eccentric strap 50 which coöperates with a suitable eccentric on the main shaft 8.

The rod 39 carrying the hook 38 is mounted so that the same may be moved vertically in its supporting bearings 41 and 42. A forked block 51 is clamped to the rod 39 and normally rests on the upper face of the lower bearings 42 for said rod. A spring 52 encircling the rod bears at its upper end against the bearing 41, and at its lower end said spring rests against a collar 53 which is clamped to the rod 39. This spring normally forces the rod 39 downwardly so that the block 51 is held against the lower bearing 42. Said block 51 is provided with spaced arms 54 which straddle a stud 55 carried by the bearing 42, and thus prevents the rod from oscillating in its bearings. At the upper end of the rod 39 there is a collar 55' having a rearwardly projecting lug 56 which extends over an arm 57 fixed to the plate 58, which in turn is clamped to the presser bar. It will thus be seen that, if the presser bar is raised, this bar 57 will engage the lug 56 and raise the rod 39, thus lifting the thread hook. The thread deflector is carried by the bracket arm 30, which is also clamped to the presser bar, and when the presser bar is raised the thread deflector will likewise be raised.

The supporting bracket 44 is attached to the head of the machine, so that its guiding face is in a line slightly inclined rearwardly from a line at right angles to the line of feed. This inclination of the supporting bracket gives to the hook 38 a path of movement which is slightly inclined rearwardly. The thread hook 38 engages the left-hand needle thread between the point of the needle and the material when the needle is on the upper end of its stroke and forms a loop in this entrance of the needle thread for the needle at the right hand, see Fig. 17. By making this path of movement of the hook inclined, as stated above, the hook, as it is forming and positioning the loop will be moving slightly toward the rear of the machine and will, therefore, clear the needle 10 and with certainty position the formed loop, so that the needle 10 will pass between the strands thereof.

The thread deflector, as above noted, is fulcrumed on a bracket carried by the presser bar and as the presser bar moves up and down with varying thicknesses of the material, said fulcrumed support for the deflector will be raised and lowered. When this thread deflector is bodily raised, the link 35 will be raised at its outer end and as this link will turn about its pivotal connection with the bracket 32 as its center, the outer end will move outwardly as well as upwardly, and this outward movement of the end of the link 35 will swing the upper end of the lever 27 outwardly and this will move back the thread finger 37. In other words, a vertical shifting of the fulcrum or pivotal point 29 of the lever 27 will slightly change the working position of the thread finger 37. When this lever is bodily raised, the extreme forward throw of the finger 37 will be in rear of the extreme forward throw in the lower position of the lever. That is, this finger as the lever is raised will cross the needle path on its rearward movement slightly earlier than it did when the lever was in its lower position. As the lever is raised, said finger 37 will, of course, be moved upwardly nearly to the extreme upward position of the needle. This timing of the thread finger when it is raised, by an increase in the thickness of the material so that it will swing under the point of the needle slightly earlier, prevents the needle from striking the thread finger.

Figs. 15 to 18 of the drawings show more or less diagrammatically the operation of the thread finger and the thread hook. When the needles are moving upwardly, as shown in Fig. 15, the thread finger is at the rear end of its stroke and the thread hook is at the left-hand end of its stroke. The thread finger 37 moves forward into engagement with the left-hand needle thread and distends or bends the same forward of the path of the needle, so that the thread hook which moves back and forth entirely in front of the needles may engage said needle thread. This position of the parts is clearly shown in Fig. 15. A continued movement of the thread hook draws the needle thread into the form of a thread loop. The finger 37 moves back out of the path of the needle and the thread hook holds the needle loop for the needle 10 to enter between the strands thereof. Inasmuch as the thread hook moves in a path slightly inclined to the line of feed, it will carry the thread loop slightly rearwardly and better position the same for the needle to pass between the strands of the loop, as clearly shown in Fig. 17. After the needle has entered the thread loop, then the thread hook 38 moves to the left, releasing said loop, as shown in Fig. 18. In this figure, the needles are on the upward stroke and the thread deflecting finger 37 is well back toward the end of its stroke ready to move forward.

The looper 11 is moved back and forth by a link 13, as above noted. This link 13 is pivoted at 60 to a three-armed rock lever 61. Said rock lever is pivoted at 62 to a bracket 63 carried by the bed plate 1 of the machine. The arm 64 of said rock lever is connected by a link 65 to a ball stud 66 carried by the needle lever extension 14. As the needle lever extension oscillates back and forth the lever will be oscillated and this rock lever changes the direction of motion, so that the looper moves toward the edges of the material to enter the needle loops when the needle lever extension is moving to the left, as viewed in Fig. 25. The looper is moved laterally for its needle avoiding movement as is usual in this type of machine.

Coöperating with the looper is a thread retainer 67, see Figs. 13, 14 and 23 to 25, inclusive. This thread retainer 67 is adjustably mounted on a retainer carrier 68 by means of a screw 69. The retainer carrier 68 is mounted to swing about a vertical pivot 70 carried by a bracket 71. This bracket 71 is adjustably connected to a supporting standard 72 by means of screws 73 which pass through slots 74. The standard 72 is secured to the bed plate 1 by a screw 75 which passes through a horizontal slot 76. The retainer carrier 68 is provided with a ball stud 77 and a link 78 engages at one end this ball stud, while the other end of this link engages a ball stud 79 carried by the arm 80 of the three-arm lever 61. This arm 80 is located slightly above the pivot 62 of the lever, so that the link 78 will be moved in a direction opposite to the link 13 which operates the looper. Inasmuch as the retainer 67 is on the opposite side of the pivot 70 from the ball stud 77, the retainer 67 will have a movement in the same direction as the looper. That is to say, when the looper is moving backward out of the needle loops or to the left, as viewed in Fig. 24, the retainer will also move to the left. The looper, however, having entered the needle loops is rocked over toward the front of the machine for its needle avoiding movement as is customary in this type of machine. This brings the looper under the projecting nose of the looper retainer 67, see Fig. 14. The backward movement of the looper positions the looper thread $c$, so that said thread extending from the eye of the looper 81 to the previous stitch lies between the needles 9 and 10. The thread of the needle 9 is indicated at $a$ and the thread of the needle 10 is indicated at $b$ in Figs. 13 and 14. The retainer 67 engages the needle loop on the looper formed in the needle thread $b$ and as said retainer is moving to the left it will crowd said needle loop at a point above the looper to the left and thus hold both needle loops back on the looper a sufficient distance to permit the needle 9 to pass into the triangle formed by the two needle loops, the looper thread and the body of the looper. The needle 10, as above noted, does not enter their triangle. It will be noted that the surface of the looper is entirely smooth and the needle loops are free to have sliding engagement with the looper except for the retainer 67.

As above noted, it has been the practice in this type of machine to provide the lower face of the looper with a retaining shoulder and this retaining shoulder operating on both needle loops held them well back on the looper, so that the needle would pass between the two needle loops and the looper thread, as above noted. This projection on the looper, however, placed the needle threads under great strain and particularly the left-hand needle thread, which was also at the same time being strained or pulled upon by the thread hook above the material to form a loop for the entrance of the needle. By my improved invention, however, wherein a thread retainer engages the right-hand needle loop at a point above the looper and positively holds it back on the looper, no such strain is necessary on the needle loops and, therefore, the breaking of the threads is avoided.

It is obvious that minor changes in the details of construction and arrangement of the parts may be made without departing from the spirit of the invention as set forth in the appended claims.

Having thus described my invention, what I claim as new and desire to secure by Letters Patent, is:

1. A sewing machine including in combination, a pair of needles, means for directing the edge of the material between the needles, a looper coöperating with both needles beneath the work support and moving toward the edge of the material when entering the needle loops, a retainer for holding the needle loops back on the looper, whereby the needle entering the material may pass between the needle loops and the looper thread, and devices for forming a loop in the needle thread of the needle entering the material and for positioning said loop whereby the needle passing over the edge of the material may enter the same.

2. A sewing machine including in combination, a pair of needles, means for directing the edge of the material between the needles, a looper coöperating with both needles beneath the work support and moving toward the edge of the material when entering the needle loops, a retainer for holding the needle loops back on the looper, whereby the needle entering the material may pass between the needle loops and the looper thread, a thread deflector for deflecting the needle thread of the needle entering the material forward of the path thereof, and a thread hook for engaging said needle thread and forming a loop therein for the needle passing over the edge of the material to enter.

3. A sewing machine including in combination, a pair of needles, means for directing the edge of the material between the needles, a looper coöperating with both needles beneath the work support and moving toward the edge of the material when entering the needle loops, a retainer for holding the needle loops back on the looper, whereby the needle entering the material may pass between the needle loops and the looper thread, means operating to deflect the thread of the needle entering the material forward of the path thereof, a thread hook for engaging said needle thread and forming a loop therein for the other needle to enter, means for supporting said thread hook, whereby the same moves in a path wholly in front of the needles and slightly inclined to a line at right angles to the line of feed, whereby the strands of the loops formed in the needle thread are positioned for the other needle to pass between the same.

4. A sewing machine including in combination, a pair of needles, means for directing the edge of the material between the needles, a looper coöperating with both needles beneath the work support and moving toward the edge of the material when entering the needle loops, a retainer for holding the needle loops back on the looper, whereby the needle entering the material may pass between the needle loops and the looper thread, a thread finger movable in a direction substantially parallel with the line of feed for engaging the thread of the needle entering the material, and a thread hook moving in a direction at an angle to the line of feed for engaging said needle thread and forming a loop therein for the other needle to enter.

5. A sewing machine comprising in combination, a work support, a presser foot, a presser bar carrying the same, two needles, a needle bar carrying said needles, means coöperating with the needles beneath the work support, a thread deflecting finger for engaging the needle thread of one of said needles and deflecting the same forward of the path of the needles, a lever carrying said deflecting finger, means for supporting said lever on said presser bar, means for actuating said lever from said needle bar, and means for engaging the deflected needle thread and forming a loop therein for the entrance of the other needle.

6. A sewing machine comprising in combination, a work support, a presser foot, a presser bar carrying the same, two needles, a needle bar carrying said needles, means coöperating with the needles beneath the work support, a thread deflecting finger for engaging the needle thread of one of said needles and deflecting the same forward of the path of the needle, a lever carrying said deflecting finger, means for supporting said lever on said presser bar, means for actuating said lever from said needle bar, a thread hook movable in front of the path of the needles for engaging said deflected thread and forming a loop therein for the entrance of the other needle, a bar supporting said thread hook, a sliding member carrying said bar, and means whereby said bar for the thread hook is raised with the presser bar.

7. A sewing machine comprising in combination, a work support, a presser foot, a presser bar carrying the same, two needles, a needle bar carrying said needles, means coöperating with the needle beneath the work support, a thread deflecting finger for engaging the needle thread of one of said needles and deflecting the same forward of the path of the needle, a lever carrying said deflecting finger, means for supporting said lever on said presser bar, means for actuating said lever from said needle bar, a thread hook movable in front of said needles, a bar supporting said hook, a sliding plate, bearings on said plate for supporting said bar, means for yieldingly pressing said bar downwardly, means for limiting the downward movement of the bar, means carried by the presser bar for raising said bar supporting the hook, and means for reciprocating said plate.

8. A sewing machine comprising in combination, a work support, two needles arranged in a line at right angles to the line of feed, means for guiding a hat sweat, a reed cover and a reed, with the reed and the edge of the hat sweat passing between the needles, a looper movable into both needle loops beneath the work support, said looper moving in a direction toward the free edge of the hat sweat when entering the needle loops, a thread deflector engaging the thread of the needle passing through the hat sweat, and a hook for engaging said needle thread and forming a loop therein for the entrance of the needle which passes beyond the edge of the hat sweat.

9. A sewing machine comprising in combination, a work support, two needles arranged in a line at right angles to the line of feed, means for guiding a hat sweat, a reed cover and a reed, with the reed and the edge of the hat sweat passing between the needles, a looper movable into both needle loops beneath the work support, said looper moving in a direction toward the free edge of the hat sweat when entering the needle loops, a thread deflector movable in a direction parallel to the line of feed and engaging the needle thread between the eye of the needle and the material of the needle passing through the hat sweat for deflecting the same toward the front of the machine, and a thread hook movable substantially at right angles to the line of feed in front of the path of the needles for engaging said deflected needle thread and forming a loop therein for the entrance of the needle which passes beyond the edge of the hat sweat.

10. A sewing machine comprising in combination, a work support, a presser foot, a presser bar carrying the same, two needles, a needle bar carrying said needles, a thread deflecting finger for engaging the needle thread of one of the needles and deflecting the same forward of the path of the needles, a lever carrying said deflecting finger, means for supporting said lever on said presser bar, a link connecting the upper end of said lever to the needle bar, said link being so disposed that the rising and falling movements of the presser bar for varying thicknesses of material will vary the oscillating position of the thread finger relative to the needle path.

11. A sewing machine comprising in combination, a work support, a presser foot, a presser bar carrying the same, two needles, a needle bar carrying said needles, a thread deflecting finger for engaging the needle thread of one of the needles and deflecting the same forward of the path of the needles, a lever carrying said deflecting finger, means for supporting said lever on said presser bar, a link connecting the upper end of said lever to the needle bar, said link being so disposed that the rising and falling movements of the presser bar for varying thicknesses of material will vary the oscillating position of the thread finger relative to the needle path, and a thread hook for engaging said deflected needle thread and forming a loop therein for the entrance of the other needle.

12. A sewing machine comprising in combination, a work support, a presser foot, a presser bar carrying the same, two needles, a needle bar carrying said needles, a thread deflecting finger for engaging the needle thread of one of the needles and deflecting the same forward of the path of the needles, a lever carrying said deflecting finger, means for supporting said lever on said presser bar, a link connecting the upper end of said lever to the needle bar, said link being so disposed that the rising and falling movements of the presser bar for varying thicknesses of material will vary the oscillating position of the thread finger relative to the needle path, a thread hook for engaging said deflected needle thread and forming a loop therein for the entrance of the other needle, a looper coöperating with both needles beneath the work support, and a loop retainer adapted to hold the needle loops back on the looper.

13. A sewing machine including in combination, a plurality of needles, a looper coöperating with all of said needles, a thread retainer for holding the needle thread loops back on said looper, said thread retainer being mounted to swing about a vertical axis.

14. A sewing machine including in combination, a work support, an overhanging arm, a needle bar mounted on said overhanging arm, a pair of needles carried thereby, a looper coöperating with both needles and movable in a direction toward the overhanging arm when entering the needle loops, a rock lever, a link connecting said rock lever with the looper for oscillating the same, a loop retainer coöperating with said looper and mounted to swing about a vertical axis, and means for connecting said loop retainer to said rock lever.

15. A sewing machine including in combination, a work support, an overhanging arm, a needle lever mounted on said overhanging arm, a needle bar connected thereto, a pair of needles carried by the needle bar and said needle lever having an extension, a looper coöperating with both needles and movable in a direction toward the arm when entering the needle loops, a rock lever, a bracket supporting the same, a link connecting said rock lever with the needle lever extension, a link connecting said rock lever with said looper, whereby the looper is moved in a direction toward the needle lever extension when said needle lever extension is moving in a direction toward the looper.

16. A sewing machine including in combination, a work support, an overhanging arm, a needle lever mounted on said overhanging arm, a needle bar connected thereto, a pair of needles carried by the needle bar, said needle lever having an extension, a looper coöperating with both needles and movable in a direction toward the arm when entering the needle loops, a rock lever, a bracket supporting the same, a link connecting said rock lever with the needle lever extension, a link connecting said rock lever with said looper, whereby the looper is moved in a direction toward the needle lever extension when said needle lever extension is moving in a direction toward the looper, a loop retainer, means for supporting said loop retainer, whereby the same swings about a vertical axis, a link connecting said loop retainer to said rock lever, whereby said loop retainer moves in the same direction as the looper when said looper is retracted from the needle loops for engaging and holding the needle loops back on the looper.

17. A sewing machine including in combination, a pair of needles, a looper coöperating with both needles, means for moving the looper into and out of the needle loops and laterally for its needle avoiding movement, a loop retainer or deflector, and means for moving said loop retainer or deflector back and forth in a single plane and across the path of the needles, said means being timed so as to cause the deflector or retainer to engage the needle thread loops to positively move the same to one side of the needles so that both needles will pass the looper in advance of both needle loops.

In testimony whereof, I affix my signature in the presence of two witnesses.

ROBERT R. HUGHES, Jr.

Witnesses:
 JOSEPH BERGER,
 MAY HUGHES.